Aug. 27, 1963　　　E. UMBRICHT ET AL　　　3,102,057
METHOD OF POWER WASHING ARTICLES
Original Filed Dec. 20, 1954　　　　　　　　　　5 Sheets-Sheet 1
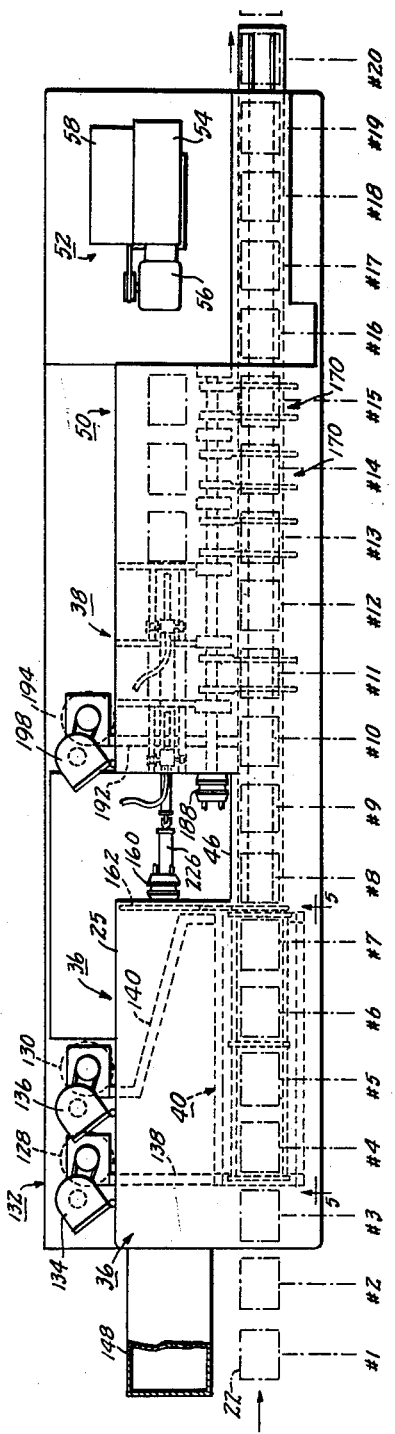
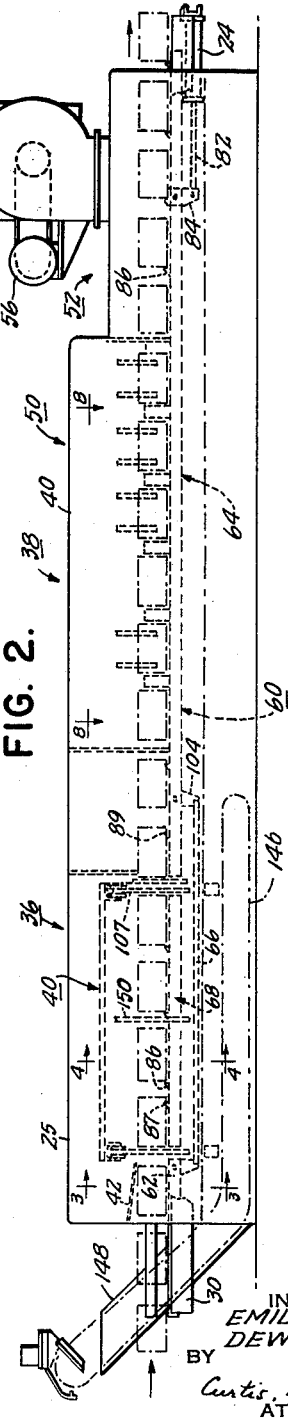
INVENTORS
EMIL UMBRICHT
DEWEY EVANS
BY
Curtis, Morris & Safford
ATTORNEYS

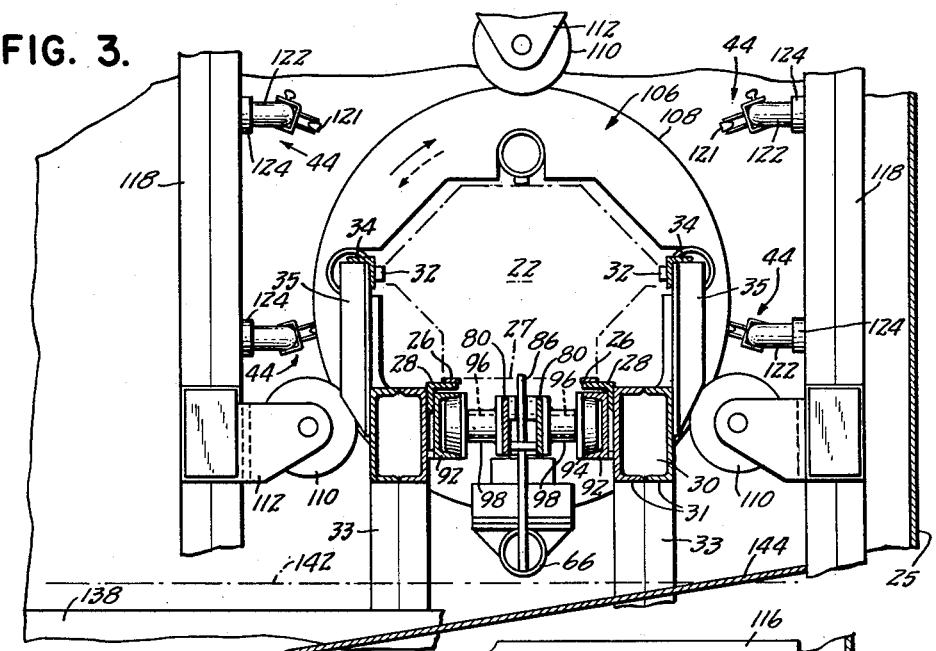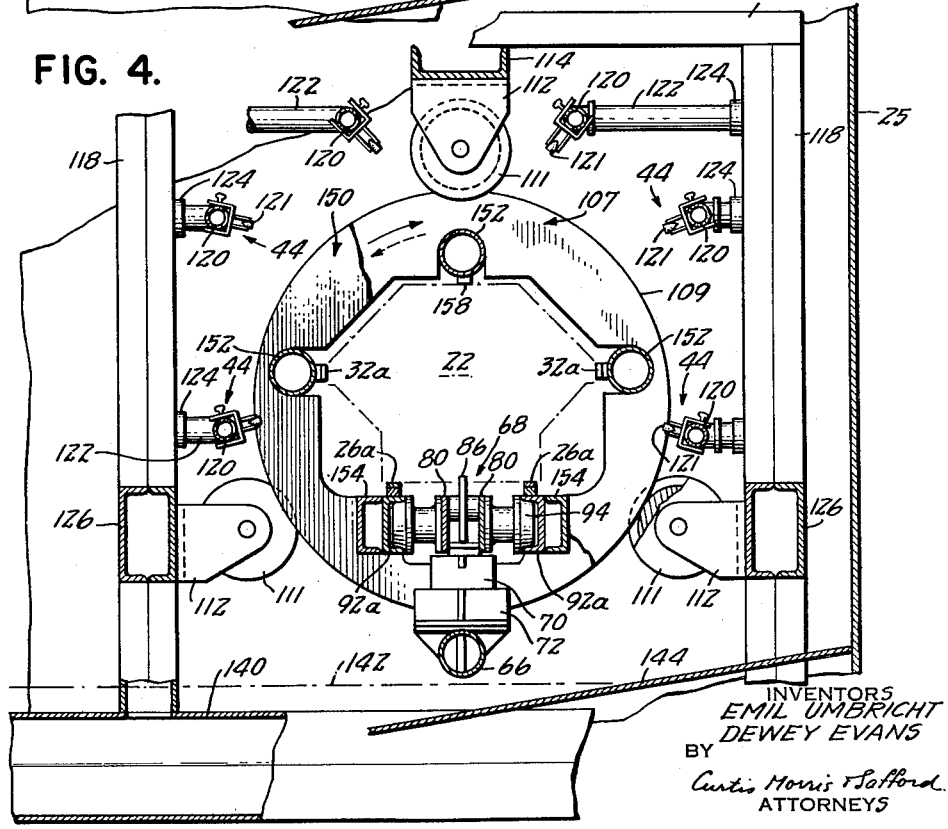

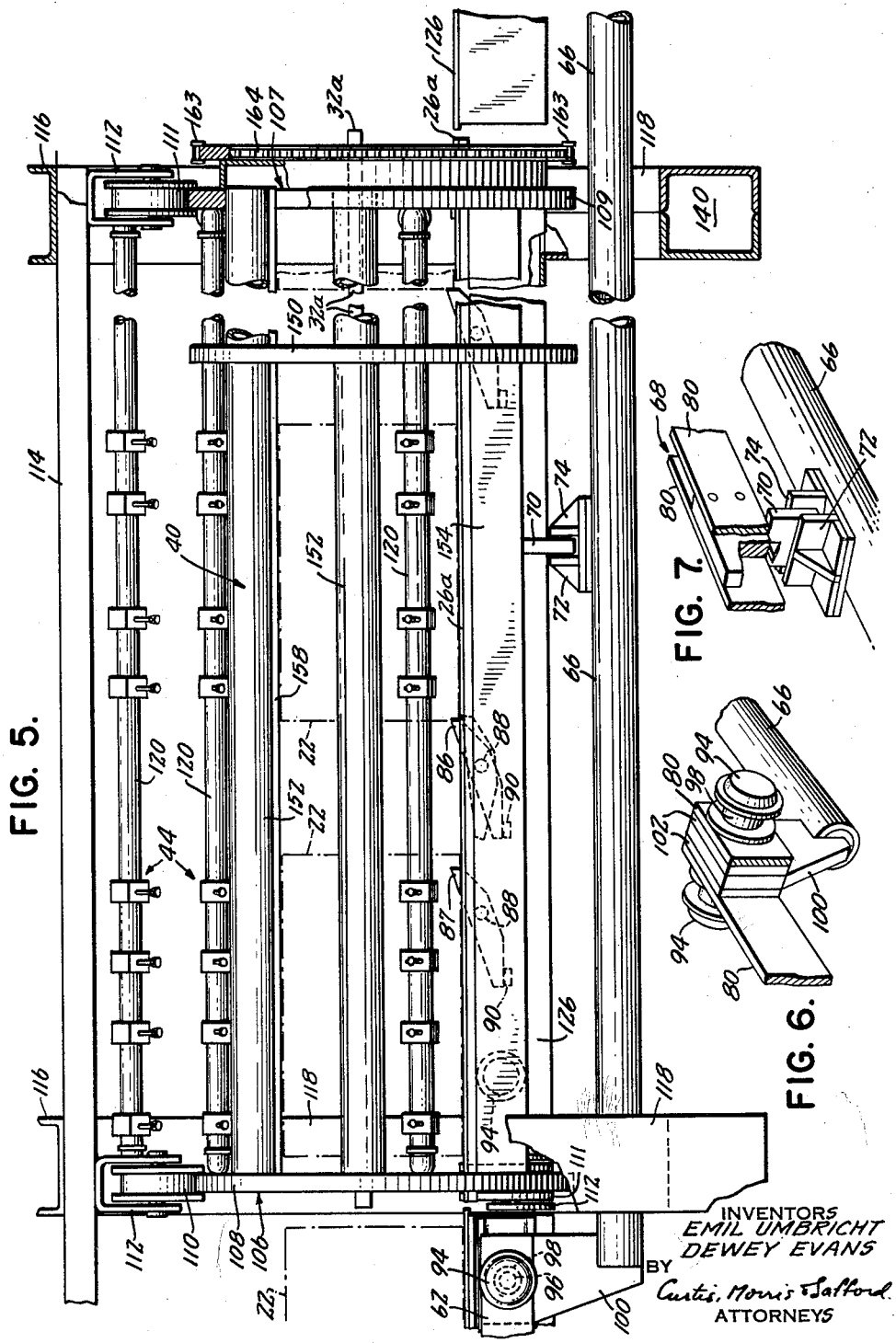

Aug. 27, 1963

E. UMBRICHT ET AL 3,102,057

METHOD OF POWER WASHING ARTICLES

Original Filed Dec. 20, 1954

INVENTORS
*EMIL UMBRICHT*
*DEWEY EVANS*
BY
*Curtis Morris & Safford*
ATTORNEYS

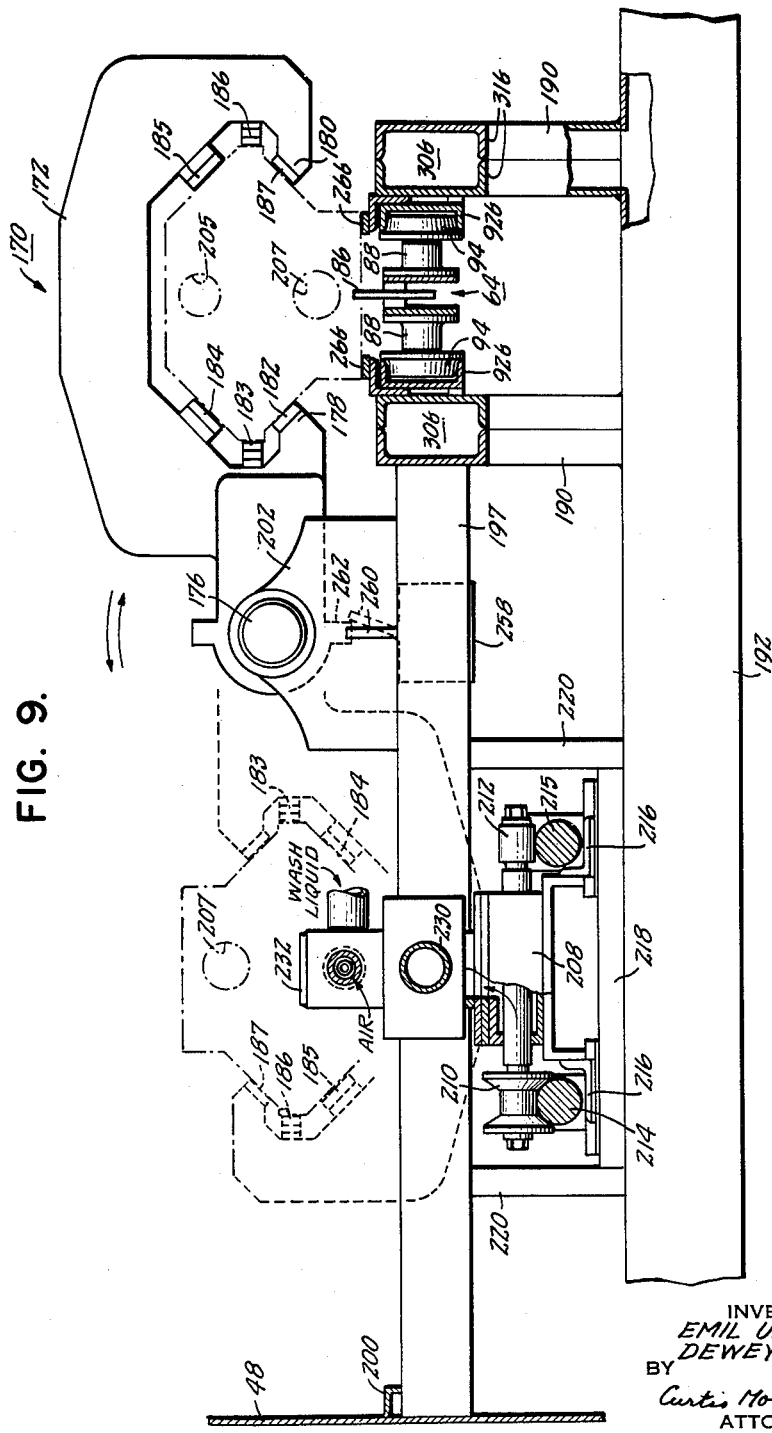

United States Patent Office 3,102,057
Patented Aug. 27, 1963

3,102,057
METHOD OF POWER WASHING ARTICLES
Emil Umbricht, Jackson, and Dewey Evans, Belleville, Mich., assignors to Ajem Laboratories, Detroit, Mich.
Original application Dec. 20, 1954, Ser. No. 476,138, now Patent No. 2,918,071, dated Dec. 22, 1959. Divided and this application Oct. 16, 1958, Ser. No. 773,128
8 Claims. (Cl. 134—23)

The present invention relates to power washing method adapted for industrial applications for cleaning various manufactured articles. This invention is described as embodied in a machine for washing under high pressure both the outside and inside of metal parts or assemblies and various other articles, and then for draining the washing liquid out of the articles and drying them.

In many mass-producing type industrial applications involving the fabrication of complicated machine parts and assemblies, it is necessary at one or more points in the production schedule to remove the various soils or other materials which adhere to both outside and inside the articles and accumulate as a result of the previous manufacturing steps, for example, such soils as moulding sand and metal particles, combined with films of the various cutting oils used during machining. The need for efficient automatic apparatus to provide the required cleaning has become increasingly important, for, in modern machinery such as automobiles, the parts are held to closer tolerances and the presence of only slight amounts of soil or contaminating material causes damage by corrosion and scouring after the parts are assembled and run.

For example, in the automobile industry it used to be true that the washing of the various parts was treated, in effect, as merely an incidental step in the assembly of the automobile. But now there have been vast increases in horsepower and engine speed. The castings are much more complex. V and Y blocks are commonly used, including many borings and oil passages, with provision for hydraulic valve lift systems, etc. With such power, speed and complexity, the tolerances are so close and the finishes are so fine that complete effective washing of the parts prior to assembly has become one of the key steps in the production line. Incomplete washing of just one portion of any one of the multitudes of passages and surfaces in any one of several parts can quickly result in failure of the test line, resulting in expensive overhauling of the engine.

The type of machine described herein as embodying the method of the present invention is well adapted for cleaning machined castings, such as automobile engine blocks and similar articles which must be thoroughly washed on the outside and have internal passages and chambers which must be forcefully flushed out before final assembly.

The various aspects, features, and advantages of the present invention will be more fully understood from the following description considered in conjunction with the accompanying drawings, in which:

FIGURE 1 is a top view of an engine block washing machine embodying the invention, the blocks enter the machine at the left end at station 1 and leave the machine at station No. 20 at the right end;

FIGURE 2 is a side view of the machine of FIGURE 1;

FIGURE 3 is a partial cross sectional view of the machine, on enlarged scale, taken along the line 3—3 of FIGURE 2, looking toward the right, and showing an end view of a roll-over block washing carriage and associated washing and block transferring mechanisms;

FIGURE 4 is a partial cross sectional view of the machine, on the same enlarged scale as FIGURE 3, taken along the line 4—4 of FIGURE 2, looking to the right and showing a cross section of the roll-over carriage and associated mechanism;

FIGURE 5 is a partial longitudinal sectional view of the machine, on the same enlarged scale as FIGURES 3 and 4, taken along the line 5—5 of FIGURE 1 looking toward the interior of the machine, showing a side elevation of the roll-over carriage and associated washing, block transferring, and carriage drive mechanisms;

FIGURE 6 is a partial perspective view, on enlarged scale, of a portion of the block transferring mechanism, seen also at the extreme left in FIGURE 5;

FIGURE 7 is a partial perspective view, on enlarged scale, of another portion of the block transferring mechanism, seen also near the bottom center in FIGURE 5;

FIGURE 8 is a partial top view, on enlarged scale, taken along the line 8—8 in FIGURE 2, looking down, and showing the flop-over block washing fixtures and mandrel mechanism for washing interior portions of the block;

FIGURE 9 is a partial cross sectional view, on enlarged scale, taken generally along the line 9—9 in FIGURE 8 looking to the right, showing the flop-over fixture and associated block transferring and mandrel mechanisms;

FIGURE 10 is a longitudinal sectional view, taken along the line 10—10 of FIGURE 8, and showing on further enlarged scale, the operation of the mandrel mechanisms in being inserted into the block for washing certain internal regions and passages in the block;

FIGURE 11 is an enlarged longitudinal sectional view of one of the mandrels shown in FIGURE 10;

FIGURE 11A is a cross sectional view, on enlarged scale, taken along the line 11A—11A of FIGURE 11;

FIGURE 12 is a further enlarged axial sectional view of the spray tip on the end of the mandrel shown in FIGURE 11; and FIGURE 13 is a cross sectional view of the spray tip taken along the line 13—13 of FIGURE 12 looking to the right.

*General Description of Machine and Transfer Apparatus*

Referring generally to the whole machine as shown in FIGURES 1 and 2, the engine blocks 22, indicated in diagrammatic forms as dotted rectangles, enter the machine at the left at station No. 1. These blocks, for example, may be coming from a production line in which they have received all of the required machining operations and are being sent through the machine to wash off and thoroughly clean from them the accumulated soils, metal filings, sand, etc., which have accumulated during the previous production steps. The blocks 22 are being washed in preparation for the assembly of the engine which begins along an assembly line stretching away from the right end of the machine. In going through the machine, the blocks 22 pass in sequence through twenty separate stations, indicated as 1 through 20, in FIGURE 1. These stations are uniformly spaced along the length of the machine. Each station may be considered as being equal in length to the length of one of the engine blocks being washed. A small space exists between the adjacent ends of the blocks in successive stations.

In order to move each of the blocks in the machine simultaneously to the next succeeding station, a transfer mechanism described in detail below, and actuated by a hydraulic cylinder 24 shown at the lower right in FIGURE 2, is used. The blocks 22 pause at each station for a brief period of time during which they are washed externally or internally, drained, or blown dry, as the case may be, and then are transferred on to the next station, and so forth on through the machine, finally leaving the machine at station 20 clean and dry, in readiness for assembly.

Stations 1 and 2 are outside of the first housing 25 of the machine. As seen in FIGURE 3, the blocks 22 have a generally V or Y configuration, indicated in phantom lines, and in stations 1 and 2 the blocks are received on supporting tracks 26 which engage outer edges of the bottom of the block or so-called pan rail. These tracks 26 are secured to longitudinally extending brackets 28 formed by angle irons welded along the length of a pair of parallel hollow longitudinal frame members 30 formed of channel irons 31 welded together flange to flange, and supported on legs 33. In other portions of the machine, frame members such as 30 also serve as manifolds for carrying the high pressure washing solutions, but they are not so used in stations 1–3.

In order to guide the blocks along the tracks 26, a pair of spaced guide rails 32 are secured along the length of the inner faces of another pair of angle iron brackets 34 supported from the main longitudinal frame members 30 by means of legs 35 secured to the outside of the main frame members. The guide rails 32 engage the blocks 22 on opposite sides at their widest points.

In stations 1 and 2 are located (not shown) certain limit switches or control sensing elements which are used to sense the presence of the blocks 22 in these stations and are inter-connected with the electrical and hydraulic control systems of the machine for controlling its operation. The sensing elements operate to restrain the operation of the transfer cylinder 24 whenever blocks 22 have not yet been loaded into stations 1 and 2, as may occasionally happen when there are delays in the production line ahead of the machine.

Stations 3 through 7 are inside of the housing 25 and comprise the roll-over washing stage, generally indicated at 36, for washing the outside of the blocks 22. Considerable internal washing also occurs, of course, but the high speed washing jets of fluid are directed mainly at the outside of the machine in this stage 36. Station 3 is just inside of the machine housing 25 and, in effect, acts as a vestibule in which each block sits before it moves into stations 4, 5, 6, and 7 which include a unitary roll-over block washing carriage, generally indicated at 40. A small entrance doorway is provided in the left end of the housing 25 between stations 2 and 3 which is just large enough to pass a block. This doorway is covered by flaps of flexible material which serve to prevent any of the high pressure washing spray from splashing out through the door onto the floor outside of the machine. In addition, various deflectors 42 are arranged closely adjacent a block as its fits in station 3 as added means of preventing the washing solution from escaping through the entrance.

The roll-over carriage 40 is advantageously adapted to carry four blocks simultaneously in spaced end-to-end relationship and to slowly roll these blocks once over and back around their longitudinal axes while they are struck by a plurality of high pressure sprays directed at them from a large number of nozzles 44, as shown in FIGURE 3. The blocks are slowly rolled over through almost a full 360° and then rolled back again, and then are transferred ahead one station, with a washed block being discharged from the right of the carriage while another block comes into the left. Thus, each block is rolled over four times as it passes the length of the roll-over carriage. The operation of the roll-over carriage is described in greater detail below.

In stations 8 and 9 the blocks are passing through a connecting tunnel in a tunnel housing 46 (seen best in FIGURE 1) between the roll-over washing stage and an internal flushing stage 38 which includes stations 10 through 13. In stations 11 and 13 the blocks are picked up off of the main tracks 26 through the machine and are swung up and over through an arc, as indicated in FIGURE 9, and are held for a period upside down before being returned to the main track. Mandrels are inserted into the blocks while they are inverted to wash out the internal passages, as explained in detail below.

Following the stage 48 is a drain-off stage 50 including two other flop-over stations 14 and 15, which are used to drain off the washing solutions which tend, in modern engine blocks with their complicated internal configurations and inter-connecting passages, to be trapped in puddles internally of the block.

Next is the drying stage, indicated generally at 52, including stations 16, 17, 18 and 19 in which the blocks 22 are thoroughly dried by means of high pressure blasts of hot air from a blower 54 driven by a motor 56 mounted on top of the housing. The air is drawn by the blower in through a suitable heating radiator 58 and is conducted to positions closely adjacent the block by means of large ducts and manifolds, then being directed by nozzles at desired areas of the blocks. The general arrangement of the various ducts, manifolds and nozzles in the drying stage 52 may be generally similar to that disclosed in our copending application, Serial No. 462,726, filed on or about October 18, 1954, now Patent No. 2,926,674, and as shown in our copending application, Serial No. 467,746, filed on November 9, 1954, now Patent No. 2,979,062.

The streams of hot air are precisely directed at desired predetermined areas of the blocks at each of the stations 16, 17, 18, and 19, and are directed at different angles in the different stations each as is best calculated to obtain the optimum drying effect of the particular parts of the block being dried in that station. The result is a highly efficient positioned drying operation.

As the blocks pass out of the machine from station 19 through station 20, they actuate other limit and control switches, which are arranged to prevent the machine from advancing the blocks in it until the block at station 20 has been removed from the machine and passed on to the assembly line.

By the use of the controls at stations 1, 2, and 20, the machine, in effect, automatically guages itself to the speed of operation of the production line ahead of it and to the assembly line following it so that the machine always operates efficiently at full capacity and yet does not pile up excess blocks into the assembly line. The machine as described herein is capable of thoroughly washing and drying in the neighborhood of 140 to 160 blocks per hour, both inside and out, with each block as it passes through the machine receiving a number of precisely controlled positioned washing operations and positioned drying operations.

For advancing the blocks from station to station, a transfer mechanism is used, mentioned above, and including a transfer bar assembly 60 extending the full length of the machine. This bar may be considered to include three sections; a loading transfer bar 62, which operates with the blocks in stations 1 through 3, a main transfer bar 64 which operates with the blocks in stations 8 through 20, inclusive, and is connected to bar 62 so as to move integrally with it by means of an offset connecting bar 66 (see also FIGURE 5). The third part of the transfer bar mechanism is the carriage transfer bar 68 which operates with the blocks in stations 4, 5, 6, and 7 in the carriage and is carried by and moves with the carriage when it rolls around. As shown in FIGURES 5 and 7, the carriage transfer bar 68 is connected with the main transfer bar only when the carriage is in its initial upright position and a clutch dog 70 projecting from the underside of the carriage transfer bar is engaged in a V-shaped notch between a pair of clutch brackets 72 and 74 welded to the top of the offset connecting bar 66 at its center.

The three transfer bar portions 62, 64, and 68 are of generally identical construction although being of different lengths. Each of these includes a pair of spaced longitudinal members 80 extending parallel and closely adjacent each other (see FIGURES 6, 7, 3, and 4). These bars 80 are held uniformly spaced by means of blocks welded there-between, not shown. The hydraulic transfer cylinder 24 reciprocates a piston rod 82 connected to a gusset 84 welded between members 80 of the main transfer bar 64, so as to drive the transfer bar assembly 60 longitudinally in the machine a distance slightly greater than the spacing between the front end of one station and the front end of the next succeeding station.

In order to engage the rear of the pan rail of the blocks 22 and advance them to the right, a plurality of drive dogs 86 are supported on pivots 88 intermediate the longitudinal members 80. These pivoted dogs are balanced so that their forward corners tend to rise up and engage the rear of the block, as shown in FIGURE 5, thus sliding all of the blocks to the right as the transfer mechanism 60 moves to the right. As the transfer bar is returned to its initial position, the projecting corners of the drive dogs strike the underside of the respective following blocks, turning the dogs a small distance clockwise as seen in FIGURE 5 so that the dogs can slide back under following blocks and then rise up and engage the rear faces of the following blocks in preparation for the next transfer. A plurality of stops 90 extending transversely between the members 80 and engaging the rear ends of the dogs prevent them from turning out of driving relationship with the rear faces of the blocks during the transfer operation.

The members 80 are supported between a pair of tracks 92 formed by spaced parallel channels having their flanges aligned and faced toward each other. Flanged tapered wheels 94 project into the open face of the channels 92 and engage the upper surface of the lower flange of the channel. As shown in FIGURES 3, 4, 5, and 6, these flanged wheels 94 are supported by stub shafts 96 projecting into the sleeve portions of flanged sleeves 98 having their flanges welded to the outer faces of the members 80. Among the many advantages of this arrangement is the ease with which the transfer bar 60, wheels 94 and tracks 92 are assembled, the stub shafts 96 being slid into sleeves 98 as the wheels 94 are fitted into the open ends of the tracks 92. Moreover, the supporting surfaces of the lower flanges of the tracks 92 are inclined somewhat downwardly toward each other; by cooperating with the tapered surface of the flanged wheels, produce a lateral guiding action as well as a supporting action.

As shown in FIGURE 6, the inter-connecting bar 66 is secured to the loading transfer bar 62 by means of a gusset 100 secured by blocks 102 between the members 80 of the loading transfer bar. A similar connection is made between the right end of the connecting bar 66 and the main transfer bar 64 in the vicinity of station 9, as shown in FIGURE 2. The reason the right gusset 104 is spaced back from the front (left) end of the main transfer bar is to provide clearance for the roll-over carriage when the front end of the main indexing bar projects into the roll-over carriage to engage its first dog 89 with the block being transferred out of station 7 into station 8.

Further details of the operation and apparatus in stages 36 and 38 are given below.

*Roll-Over Washing Stage*

The roll-over washing stage 36 includes the roll-over carriage 40, which occupies stations 4, 5, 6, and 7. In order to support the carriage for revolution while enabling the blocks to be moved in at one end and out the other, the carriage 40 has front and back end frames 106 and 107, respectively, which are open at the center. These frames are generally annularly shaped with their rims forming circular tracks 108 and 109, engaged by sets of three rollers 110 and 111, respectively.

Each of the upper rollers 110 and 111 is supported (see FIGURES 4 and 5) by a U-shaped bracket 112 secured to a longitudinal brace 114 extending through the housing 25 over the axis of the carriage 40. This brace 114 is secured to cross braces 116 whose ends cap four hollow vertical frame members 118, two at each end of the carriage 40, which advantageously perform the combined functions of supporting the rollers 110 and 111 and of supporting a plurality of longitudinal spray pipes 120 (FIGURE 4) and of serving as manifolds for feeding the washing solution under high pressure to these pipes. The frame manifolds 118 are formed by two channels face to face with the edges of their flanges welded together in a watertight seam, thus providing a rectangular configuration.

The horizontal spray pipes 120 each have a number of holes spaced along their length and facing generally inwardly toward the axis of the carriage 40. A plurality of the adjustable spray nozzles 44 are clamped on them and are directed so that streams of washing solution impinge on the blocks in the carriage 40 at various predetermined angles for optimum effectiveness. These adjustable spray nozzles are described in detail and claimed in our copending application filed on or about October 18, 1954, Serial No. 462,726, now Patent No. 2,779,841, and are generally characterized by highly effective bullet-shaped spray directors 121 of the type disclosed and claimed in an application of Emil Umbricht, Serial No. 334,420, filed February 2, 1953, now U.S. Patent No. 2,778,685.

In order to support the pipes 120 in a generally circular configuration approximately coaxial with the axis of revolution of the carriage 40, short horizontal pipe nipples 122 of different lengths connect the ends of the pipes 120 to the vertical frame manifolds 118. These nipples are readily secured to the manifolds 118 by merely threading them into flanged pipe collars 124 welded to the manifolds. The rectangular shape of the manifolds 118 facilitates this welding. The pairs of lower rollers 110 and 111 are secured by similar U-shaped brackets 112 to the vertical frame manifolds 118 at their junctions with a pair of horizontal frame manifolds 126 extending longitudinally between the vertical frame manifolds 118.

In order to supply large volumes of washing solutions to all of the many spray nozzles 44 under high pressure, a pair of centrifugal pumps (see FIGURE 1) 128 and 130 are used. These may advantageously be of the high volume, high pressure non-clogging type disclosed by Emil Umbricht in application Serial No. 357,450, filed May 26, 1953, now Patent No. 2,890,660. These pumps are entirely submerged in the washing solution inside a large side tank 132, with the pump shafts projecting up above the top of the tank and driven through V-belts by a pair of electric motors 134 and 136, respectively, pivotally supported from the side of the housing 25 to enable adjustment of the belt tension. The pump outlets are connected to large rectangular mains 138 and 140 extending across beneath the liquid surface 142 (FIGURES 3 and 4) to the vertical manifolds 118. The liquid 142 freely flows from the interior of the housing 25 back into the tank 132. To facilitate sludge removal, a sloping floor plate 144 slides any sludge over into the side of the bottom of the housing 25 near the tank 132 where it is picked up by a conveyor belt 146, as shown in FIGURE 2, and pulled up and out a chute 148 for convenient disposal.

The carriage 40 includes a middle annular frame 150, as shown in FIGURE 5 and being shown as broken away in FIGURE 4. This middle frame is identical with the end frames 106 and 107, except that it is not also supported by rollers. These annular frames 106, 107, and 150 are inter-connected by three longitudinal pipe spars 152 which are welded into notches cut in the frames and also by means of pairs of channel braces 154 and 92a welded to the three frames 106, 107, 150 and extending the length of the carriage. The inner braces 92a of these pairs serve as continuations of the tracks 92 so as to support the flanged wheels 94 of the carriage transfer bar 68. Parts of the carriage 40 performing functions corresponding to those of parts in stations 1, 2, and 3 have corresponding reference numerals followed by the suffix "a." The four blocks 22 in the carriage are supported by tracks 26a fastened to the top of the inner braces 92a and are guided at each side by lateral guide rails 32a welded along the inside faces of the pipes and are confined at the top by another similar guide rail 158 along the underside of the top spar 152 which supports the blocks as the carriage rolls over so as to prevent tumbling of the blocks in the carriage.

In order to roll the carriage 40 clockwise around its axis, through substantially 360° from its initial position, as seen in FIGURES 3 and 4, and then to roll it back again, a hydraulic torque motor 160, shown in FIGURE 1 supported from the right end of the housing 25, is used. This hydraulic motor is of a high-torque type producing a rotation of its shaft of about 280° and turning a sprocket gear 162, shown in FIGURE 1, connected by a sprocket chain 163 (FIGURE 5) to a slightly smaller annular gear 164 on the right end of the roll-over carriage, as seen in FIGURE 5. The ratio of these two sprockets is such that the carriage 40 rolls over substantially 360° and then rolls back again. In accordance with usual well-known practice in the art, a sequence of control switches is arranged around the shaft of the hydraulic torque motor 160 and are actuated by rotary motion of the motor shaft at predetermined shaft positions in order to produce smooth acceleration of the roll-over carriage as it begins to turn and to decelerate it smoothly at the end of one rotation so as to reverse it smoothly to prevent any undue shock in the machine as the four blocks are rotated over and back.

Among the advantages of this axial roll-over washing action is the fact that the blocks 22 are enabled to be held in closely spaced end-to-end relationship while they are rolled over. Thus, the spray, in effect, has a concentrated target, resulting in a highly efficient washing operation, for only a very small percentage of the washing solution can pass through the small spaces between the four blocks. The rolling motion of the blocks is very effective in loosening the soil material and dumping it out of the blocks. Moreover, the reversal in rolling directions helps in dumping out the dirt.

When the carriage returns to its initial position, the clutch dog 70 engages between the clutch brackets 72 and 74 so that the carriage transfer bar is locked to the remainder of the transfer bar mechanism to form effectively a unitary transfer mechanism 69 extending the full length of the machine for transferring all of the blocks, including those in the carriage, on station to the right. The block in station 7 is pushed out of the rear of the carriage 40 through the center of the annular gear 164 and another block comes in the front end of the carriage through the center of the frame 106. In order for the carriage transfer bar 68 to engage the block coming into the front end of the carriage, an additional block drive dog 87 is used near its front end. As the block is coming into the carriage, the dog 87 catches the inside of the front end of the block pan rail, as shown in FIGURE 5, so as to pull this block the rest of the way into the carriage.

As seen in FIGURE 2, a similar block drive dog 89 is included near the front end of the main transfer bar 64 to catch the front end of the block being pushed out of the carriage 40 so as to pull it the rest of the way into station 8.

*Mandrel Flushing Stage*

After passing through the tunnel stations 8 and 9, the blocks enter the flop-over and mandrel flushing stage 38, which includes stations 10 through 13. In station 10, the block may receive further washing, if desired, in readiness for the first flop-over and mandrel flushing operation which occurs in station 11. Then in station 12, as seen in FIGURE 10, the block is again washed off on the outside by a plurality of pipes 168, as shown most clearly in FIGURE 8, and spray nozzles. In station 13 a second flop-over and mandrel flushing operation occurs, as described in detail below. Stations 11 and 13 are each considered to include both the positions of the block when it sits upright on the tracks 26b, as seen in FIGURE 9, and its alternate position shown dotted when it has been inverted.

As shown in FIGURES 8 and 9, in order to lift the Y-blocks from the tracks 26b at stations 11 and 13 to swing them up and over into an upside down position, as shown dotted, a pair of flop-over fixtures 170 engage the block. Each of these fixtures includes a front and a back generally C-shaped frame 172 and 174, respectively, secured to a rotatable shaft 176 and with inner and outer arms 178 and 180, respectively, to lift the block. A plurality of guiding and supporting rails 182—187 interconnect the frames 172 and 174 and define a cradle for receiving and holding the wider top half of the block. The rails 184 and 185 support the block when it is inverted. To turn the shaft 176 through 180° and back, a hydraulic torque motor 188 (FIGURE 1) is directly coupled to the front end of the shaft 176 near the tunnel housing 46. This motor is controlled for smooth acceleration and deceleration.

Parts of the machine in this stage 38 performing functions corresponding to those of other parts earlier in the machine have the same reference numerals followed by the suffix "b."

The construction of the manifold frames 30b and the way in which the tracks 26b and the main indexing bar 64 are supported from the frames 30b is substantially identical with the construction shown in FIGURE 3, and accordingly a detailed description of it is not repeated here. An important difference between the frames 30 and 30b is that the latter are used to convey washing solution and are connected by short hollow rectangular supports 190 to a main 192 supplied by a pump 194 (FIGURE 1) driven by a motor 196. The spray pipes 168 in station 12 are supplied directly from the manifolds 30b. Also, as seen in FIGURES 8 and 9, the left frame 30b is braced against the housing wall 48 by a plurality of transverse beams 197 and 198 with their opposite ends secured to a horizontal wall bracket 200. The transverse braces 197 and 198 serve as supports for the bearings 202 for the shaft 176.

In order thoroughly to flush out the many intricate passages in the block 22 when it is in inverted position, a pair of mandrels 204 and 206 are inserted axially into the block through the opening 205 for the cam shaft and the opening 207 for the crank shaft, respectively. These mandrels are hollow and have a number of radial orifices which become aligned, when fully inserted, with the open ends of the various passages in the block. High pressure air and washing liquid streams from these orifices then flush out the passages in the block, as described in detail further below. These mandrels are carried on a hollow trolley frame 208 supported by pairs of wheels 210 and 212 which roll on a pair of spaced parallel round rods 214 and 215. The left wheels 210 in each pair have generally V-shaped flanges to guide the trolley 208 accurately along the rods 214, and the trolley is prevented from leaving the rods by L-shaped retainers 216 extending out under the rods. As seen in FIGURES 9 and 10, the front ends of the rods 214 and 215 are secured to the end wall of the housing 48 above a transverse stiffener 217, and their rear ends are fastened to cross pieces 218 supported by vertical struts 220 from one of the main cross braces 198. Supported on top of the main cross beams 198 are horizontal stop plates 222 (FIGURE 10) which abut against the blocks 22 in their inverted position so as to position them precisely ahead of the mandrels 204 and 206. An additional vertical stop 224 engages the front end of the block to prevent any chance for the block to shift ahead in the fixture as the mandrel is inserted.

In order to drive the trolley 208 from its initial position shown in full lines in FIGURE 10 ahead to the dotted line position with both mandrels fully inserted into the blocks and then back to the initial position, a hydraulic cylinder 226 (FIGURE 1) is used with its piston rod 228 connected by a drive shaft 230 to a box 232 on the left end of the trolley 208, from which the cam shaft mandrel 204 projects. The crank shaft mandrel is slightly larger in diameter than the cam shaft mandrel because the crank shaft bearing holes 207 are larger, and it projects from a similar but higher box 234 at the right end of the trolley.

These boxes 232 and 234 are connected by flexible hoses 236 and 238, respectively, to a suitable high pressure source of washing solution. These hoses 236 and 238 may, for example, be connected directly to the high pressure manifolds 30b. Alternatively, we prefer to supply the mandrels with washing solution under even higher pressure than is available from the manifolds 30b. Thus, the hoses 236 and 238 are connected to a separate higher pressure supply manifold 197. For example, the pump 194 may be a two-stage centrifugal pump of the type disclosed and claimed by Emil Umbricht in copending application Serial No. 462,661, filed October 18, 1954, now Patent No. 2,873,685. With this two-stage pump, the first stage is connected to the main 192 for feeding the manifolds 30b, and the second stage is connected to a separate higher pressure manifold 197 and valves 258 for the hoses 236 and 238, as described further below.

To produce a highly advantageous flushing action, each of the mandrels 204 and 206 includes an inner coaxial air pipe supplied with air under high pressure through the flexible hoses 240 and 242, respectively. For example, as shown in FIGURES 11 and 11A, the crank shaft mandrel has an inner coaxial pipe 244 with its rear end connected to the air hose 242 and with its other end closed off. The mandrel 206 and pipe 244 are held in concentric relation by three radial struts 246. The pipe 244 has a plurality of small orifices 248 which are aligned with the larger radial orifices 250 in the mandrel 206. After the mandrel 206 has been fully inserted for a period of time, a blast of air is shot out through the orifices 248. This air blast has a number of effects. Initially it accelerates the slugs of washing solution which are leaving the orifices 250 as it is turned on. Then the air blast displaces in considerable measure the washing solution from its path; so that the jets issuing from the orifices 250 act like jets of compressed air with quantities of spray and slugs of solution mixed in. As soon as the air blast stops, the washing solution again surges out of the orifices 250 in effect as solid slugs. The result of this air blast sequence is a highly effective surging, shocking action which dislodges the most stubbornly wedged metal filings or other foreign material from the passages in the block. A series of air blasts or a continuous blast during both insertion and removal as well as while inserted can be used, if desired, but we find that a single short blast during the middle of the flushing period when mandrels are fully inserted is sufficient. A timing device, not shown, inter-connected with the electrical and hydraulic control circuits actuates a valve to release the air blast through both of the hoses 240 and 242. The cam shaft mandrel operates similarly to the crank shaft mandrel.

In order to flush out the cam shaft and crank shaft bearing holes 205 and 207 as the ends of the mandrels 204 and 206 are inserted to make certain that no dirt particles can jam against the inserted mandrels, a conical wall of spray is generated ahead of the end of the mandrel by a conical deflector 252 supported by three radial vanes 254 opposite a large orifice 256 in the end of the mandrel.

For maximum efficiency it is desirable to have washing solution fed to the mandrels 204 and 206 only while the blocks are fully inverted, i.e., only during the advance and return of the trolley 208. For this purpose, as shown in FIGURE 8, the hoses 236 and 238 are connected through a two-way valve 258 having an actuating arm shown in FIGURE 9 at 260 which is cammed over by a trigger 262 on the hub of the frame 172 of the cam shaft mandrel flushing fixture in station 11. This two-way valve 258 is preferably supplied from a higher pressure source such as the manifold 197 connected to the second stage of a two-stage pump as described above. When the valve arm 260 is actuated, this high pressure source is connected to the hoses 236 and 238, but otherwise it is connected into the manifolds 30b so as to boost their pressure. Alternatively, the wash liquid from the valve 258 may be supplied through a hose 264 connected near the center of the hollow trolley frame 208. Dotted arrows in FIGURE 10 indicate the flow from the hose 264 through the hollow trolley frame 208 to the mandrel boxes 232 and 234.

The fixture 170 is described as adapted for engaging the enlarged top portion of V or Y-block engines, and this is a preferred arrangement whereby the track 26b is advantageously enabled to be continuous through the mandrel stage 38 and likewise the transfer mechanism advantageously is enabled to be continuous throughout this stage. However, the fixture 170 can be arranged similarly to engage blocks 22 which are sent through the machine upside down, as may be desirable in certain production lines. In this case, the arms 178 and 180 and the supporting rails 182 and 187 are arranged to engage the inclined faces of the block at the top end of each cylinder. That is, with the blocks inverted, rails 182 and 187 engage the faces corresponding to those now engaged by the rails 184 and 185.

For straight in-line engines, the depending arms 178 and 180 can be arranged to project down on either side and underneath the edges of the pan rail of the machine, or short portions of the track 26b in stations 11 and 13 are detached from the rest of the track and are connected to the frames 172 and 174 and are used to lift the blocks when they are inverted.

Among the advantages of this flushing operation by the two mandrels in sequence is that many of the passages in the block are inter-connected between the cam shaft and crank shaft bearing holes 205 and 207. Thus, these passages are purged first in one direction and later in the other by the surging cleaning action of the cleaning solution and air from the mandrels 204 and 206.

Although these mandrels are described as both inserted from the same respective ends of the blocks or other articles to be flushed they can in certain cases depending upon the configuration of the blocks or other articles be inserted into the opposite sides of the blocks or other articles either simultaneously or in sequence. Moreover, these mandrels can be inserted into the blocks or other articles from various angles or positions either from above, below, or either side in accordance with the configuration of the items being flushed.

*Draining and Drying Stages*

The flop-over drying stage 50 includes stations 14 and 15 in which the blocks are again picked up by two more fixtures 170 and swung upside down so as to drain out any puddles of washing solution which may be trapped in the block. In many instances it may be found that only one drain-off station is required, depending on the block configuration.

In the drying stage, including stations 16 through 19, the blocks are blown dry as described above. The number of stations used to dry the block is determined by its configuration. Four stations are shown, but in many instances fewer stations may be used. In certain instances the drying stage may be omitted altogether, because the washing solution contains powerful corrosion inhibiting agents so that the amount of wetness remaining after the draining stage can dry by natural evaporation, but usually at least one station for blowing the blocks dry would be used.

*Sequence of Operation*

Although many aspects of the sequence of operation of the machine will be clear from the foregoing description, a summary of the operation is set forth here for convenient reference.

Upon starting an operating cycle the working parts are positioned as follows:

(1) The transfer mechanism 60 is in initial position (i.e. transfer cylinder rod 82 is extended). The mandrel trolley 208 is in initial position (i.e. mandrel cylinder rod 228 is retracted). The roll-over carriage 40 is in initial position and so are the flop-over fixtures 170.

(2) If blocks are in the loading station and the unloading station is empty, then the transfer mechanism 60 advances all of the blocks to the next stations.

(3) The transfer mechanism 60 then returns to initial position and dwells there while the following occurs:

(4) The roll-over carriage 40 slowly rolls over and back to initial position.

(5) At the same time, the fixtures 170 pick up blocks and invert them, dwelling in the inverted position.

(6) The mandrel trolley 208 advances the mandrels into the block and dwells there for a period while the flushing occurs and the air blast is turned on and off, and then the mandrel trolley returns to initial position.

(7) The fixtures 170 swing back to initial position.

(8) The cycle repeats if the loading station has again been filled and unloading station is empty.

These cycles of operations are produced by combined electric and hydraulic control systems of the type well known in the art; for example, being generally like the circuits disclosed in our copending application Serial No. 467,746, filed November 9, 1954. In such systems electric switches are used as the sensing elements to sense the positions of the blocks in the loading and unloading stations and are used to sense the positions of the transfer piston rod 82, the mandrel piston rod 228 and the positions of the shafts of the hydraulic torque motors 160 and 188. These electrical switches actuate solenoid-operated hydraulic control valves in a hydraulic control system. These solenoid valves then direct the flow of the hydraulic fluid in the control system so as to move pistons which, in turn, develop sufficient force to open and close the main valves for operating the piston rods 82 and 228 and for operating the motors 160 and 188, as will be understood.

Among the other advantages of this machine is the fact that it is so effective that the cleaning solutions can be used at room temperatures. This is a tremendous boon to the production workers in the summertime, for it eliminates one of the customary troublesome sources of heat in auto engine production lines, i.e., the steam-heated tanks of washing solution previously used in attempts to clean off the blocks.

Another advantage of this machine is the ready accessibility of the two torque motors 160 and 188 and of the mandrel actuating cylinder 226, all in the space beside the tunnel 46, so that they can be easily serviced. Likewise, the transfer cylinder 24 is accessible from outside at the right end of the machine.

From the foregoing description it will be understood that the power washing method and apparatus of the present invention are well adapted to provide the many advantages discussed above, and that they can be adapted to a wide variety of industrial washing and cleansing operations and that various changes or modifications may be made therein, each as may be best suited to a particular application, and that the scope of the present invention as defined by the following claims, is intended to include such modifications or adaptations limited only by the prior art.

What is claimed is:

1. The method of power washing articles having openings comprising the steps of transferring the articles along a path uniformly spaced one behind another through a series of uniformly spaced stations with intermittent motion occurring during alternate first and second time periods, in a first period of which every article along said path is simultaneously transferred ahead from one station to the next and during a second period of which every article along said path remains in a station, directing high pressure streams of cleaning fluid at predetermined respective areas of an article as the article remains stationary in a predetermined station along said path, and simultaneously during said second time periods revolving a plurality of the articles in a plurality of adjacent stations while retaining them in their respective stations, and directing at them as they revolve high-pressure streams of cleaning fluid.

2. The method as claimed in claim 1 for washing and flushing articles having internal openings in which during said second time periods another one of the articles along said path in a station separate from said plurality of stations is picked up from the path and swung into an inverted alternate position in its station and is internally flushed by jets of fluid conveyed in through at least one of said openings.

3. The method of power washing and flushing articles having internal cavities comprising the steps of arranging the articles along a path uniformly spaced one behind another with each article in a predetermined station along said path; simultaneously transferring all of the articles along said path from one station to the next by means of intermittent motion occurring during alternate time periods; in periods intermediate said transferring motions revolving a plurality of the articles in a plurality of adjacent stations simultaneously; directing at the articles as they revolve high pressure streams of cleaning fluid; in periods intermediate said transferring motions shifting another one of the articles which is along said path and in a station separate from said plurality of stations over into an inverted alternate position; internally flushing said inverted article by means of high-pressure streams of cleaning liquid conveyed into said inverted article through at least one of said cavities; and alternating, at least partially, with said streams of liquid a blast of gaseous material under high pressure.

4. The method of power washing articles comprising the steps of transferring the articles along a path uniformly spaced one behind another through a series of uniformly spaced stations with intermittent motion occurring during alternate time periods, in one of which every article along said path is simultaneously transferred ahead from one station to the next station and during the other of which every article along said path remains in the respective stations, simultaneously revolving a plurality of articles in adjacent stations during the other of said alternate time periods at least a substantial part of a full revolution and then revolving them back again in the opposite direction and directing at the revolving articles high pressure streams of cleaning fluid as they revolve in one direction and then in the opposite direction.

5. The method of power washing articles comprising the steps of arranging them along a path uniformly spaced one behind another, intermittently advancing all of the articles along said path a distance such that each article reaches the same position on said path as occupied by the preceding article, intermediate said advancing motions revolving a plurality of adjacent articles around an axis parallel with said path for at least one full revolution and back again, and directing high pressure streams of cleaning fluid at said plurality of articles as they revolve in each direction.

6. The method of automatically power washing and flushing out complex manufactured machine parts having openings therein with interior passages extending from said openings such as the openings and passages in internal combustion engine blocks and similar parts to remove soil materials, metal particles, and similar contaminating materials comprising the steps of arranging the parts to be cleaned along a path in a plurality of spaced stations, simultaneously advancing all of the parts along said path from one station to the next by means of intermittent motion occurring during alternate time periods, in periods intermediate said advancing movements revolving the part in at least one station and directing at the revolving part high pressure streams of cleaning fluid, and in periods intermediate said advancing movements internally flushing the openings and passages in the part in another station by means of at least one high pressure stream of cleaning liquid conveyed into the part through one of the openings.

7. The method of automatic power washing and flushing of complex manufactured machine parts having openings therein with interior passages extending from said openings such as the openings and passages in internal combustion engine blocks and similar parts to remove soil materials, metal particles, chips and similar contaminating materials comprising the steps of arranging the parts to be cleaned along a path in a plurality of spaced stations, simultaneously advancing all of the parts along said path from one station to the next by means of intermittent motion occurring during alternate time periods, in periods intermediate said advancing movements turning the part in at least one station and directing at the turned part high pressure streams of cleaning fluid and then returning the turned part to its initial position, and in period intermediate said advancing movements internally flushing the openings and passages in the part in another station by means of high pressure streams of cleaning liquid conveyed into the part through one of the openings and directed into the interior passages.

8. The method of automatically power washing and flushing complex manufactured machine parts having openings therein with interior passages extending from said openings such as the openings and passages in internal combustion engine blocks and similar parts to remove dirt and metal particles lodged in the passages comprising the steps of arranging the parts to be cleaned along a path in a plurality of spaced stations, simultaneously advancing all of the parts along said path from one station to the next by means of intermittent motion occuring during alternate time periods, in periods intermediate said advancing movements turning the part in at least one station and directing at the turned part high pressure streams of washing liquid, in periods intermediate said advancing movements internally flushing the openings and passages in the part in another station by means of at least one high pressure stream of cleaning liquid conveyed into the part through one of the openings and directed into said passages, and surging the cleaning liquid intermittently into said passages.

References Cited in the file of this patent

UNITED STATES PATENTS

| | | |
|---|---|---|
| 780,488 | Young | Jan. 17, 1905 |
| 807,367 | Eick | Dec. 12, 1905 |
| 1,046,062 | Felt | Dec. 3, 1912 |
| 1,814,551 | Graban | July 14, 1931 |
| 1,827,140 | Cupedo | Oct. 13, 1931 |
| 1,906,548 | Davis | May 2, 1933 |
| 1,939,836 | Tolfree | Dec. 19, 1933 |
| 1,978,721 | Perkins | Oct. 30, 1934 |
| 1,983,084 | Janus | Dec. 4, 1934 |
| 2,098,526 | Stegemann | Nov. 9, 1937 |
| 2,225,946 | Arey | Dec. 24, 1940 |
| 2,234,909 | Arey | Mar. 11, 1941 |
| 2,239,073 | Arey | Apr. 22, 1941 |
| 2,535,111 | Wishart | Dec. 26, 1950 |